May 10, 1960 E. WENNERBO 2,936,180

PHONOGRAPH STYLUS INDEXING MECHANISM

Filed Oct. 6, 1953 2 Sheets-Sheet 1

INVENTOR:

ERIK WENNERBO

By: Young, Emery & Thompson

Attys.

May 10, 1960 E. WENNERBO 2,936,180

PHONOGRAPH STYLUS INDEXING MECHANISM

Filed Oct. 6, 1953 2 Sheets-Sheet 2

INVENTOR:

ERIK WENNERBO

By Young, Emery & Thompson
Attys.

United States Patent Office 2,936,180

Patented May 10, 1960

2,936,180

PHONOGRAPH STYLUS INDEXING MECHANISM

Erik Wennerbo, Motala, Sweden, assignor to Industriaktiebolaget Luxor, Motala, Sweden, a corporation of Sweden Application October 6, 1953, Serial No. 384,457

Claims priority, application Sweden October 11, 1952

1 Claim. (Cl. 274—15)

The present invention relates to an arrangement in connection with the tone arm of a phonograph for automatically placing the phonograph needle in the correct initial playing position on a record to be played irrespective of the size thereof.

In the British patent specifications 554,282 and 678,-136 such devices are shown. Here a member cooperating with the tone arm is arranged, which, when the tone arm is moved on to the record at a distance from the centre thereof, which corresponds at most to the radius of the initial sound groove in a record of the smallest size intended to be played, is located below a horizontal plane through the needle point in order to come to rest upon the record, after which the tone arm by means of said member in cooperation with the rotation of the record or by means of a special mechanism driven by the phonograph motor is given an outward movement until said member drops outside the record, thereby enabling the engagement of the needle with the record.

As the member is carried by the tone arm itself, it has been necessary to supply the tone arm with control devices for bringing the member above and below the horizontal plane of the phonograph needle. These control devices complicate the tone arm and together with the member contribute to make the tone arm heavier, which now undesirable as it is necessary to keep the weight down to a level appropriate for playing the so called LP-records. As the member together with its control devices are always carried by the tone arm, they may also have an adverse effect on the sound reproduction during the playing of the records. In the device according to the present invention these disadvantages have been eliminated.

The invention is described in the following with reference to the drawings, wherein.

Figure 1:
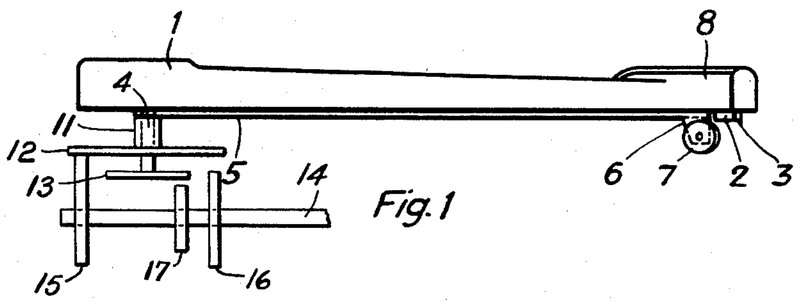
Fig. 1 is a side view of the arrangement according to one embodiment.

In the drawing 1 designates a tone arm with cartridge 2 and needle 3. The tone arm 1 is fixed to a vertical shaft 4 and is rotatable with this shaft as a pivot.

Figure 2:
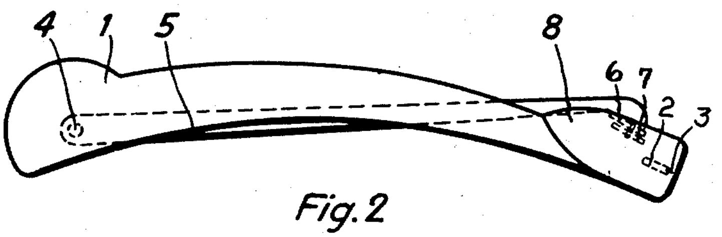
Fig. 2 is a top view of the same embodiment.

In the embodiment according to Figs. 1 and 2 an arm 5 is disposed below the tone arm 1 and is pivotally mounted about the shaft 4. For this purpose the arm 5 is provided with a sleeve 11, which surrounds the shaft 4. At the lower end of the sleeve 11 and fixed thereto there is a plate 12, whereas at the lower end of the shaft 4 and fixed thereto there is another plate 13. Below the two plates 12 and 13 a horizontally directed control shaft 14 is arranged, this shaft making part of the drive mechanism for the phonograph. The shaft 14 is provided with cam discs 15, 16 and 17, the cam discs 15 and 16 for engagement with the plate 12 on either side of it and the disc 17 for engagement with the plate 13.

The arm 5 has a plane upper side which faces the underside of the tone arm 1. At the end of the arm 5 opposite to the shaft 4 there is a downwardly directed projection 6, in which a roller 7 is rotatably mounted. When the tone arm, as shown in Figs. 1 and 2, is resting on the arm 5 the roller 7 is located below the tone arm head at a position laterally from the needle point corresponding to the width of the outer smooth rim of the record and with the lower edge of the roller somewhat below the needle point.

The device described above functions as follows. When the tone arm is at its rest position outside the periphery of the turntable, not shown, the parts have the relative positions shown in Figs. 1 and 2, in which the tone arm is supported on the plane upper side of the arm 5. It has here been presumed that the device is used on a record changer of the type, where the records are in turn transported to the turntable and are there piled upon each other. After a record has been fed to the turntable the arm 5 according to the invention is given a rotation clockwise (Fig. 2) by the cotrol shaft 14 via the cam disc 15, plate 12 and sleeve 11 and is thereby brought inwards towards the centre of the turntable and then downwards against the rotating record. The tone arm 1, which all this time has been carried by the arm 5, is naturally moved in the same manner. The position at which the arm 5 is set down upon the record is so chosen that the needle point now will be located at a distance from the rotational centre of the record, which corresponds at most to the radius of the initial sound groove in a record of the smallest size intended to be played. When the arm 5 and the tone arm 1 are lowered against the rotating record the roller 7 will come into contact with the surface of the record and as the shaft of the roller forms an angle with the radius of the record drawn through the point of engagement of the same with the roller, this will impart an anticlockwise movement to the arm 5 and the tone arm outwards to the periphery of the record. When the roller has arrived at the outer edge of the record it drops outside the edge. Because of the distance between the roller 7 and the needle 3 the needle will now be in engagement with the initial sound groove of the record. With record changers for the playing of records of various diameters, it will be necessary to have the distance between the lower edge of the roller and the needle point less than the thickness of a record. As the roller drops outside the edge of the record the arm 5 is separated from the tone arm 1, which in a usual manner can now play the record. It is to be preferred but it is of course not necessary to move the arm 5 further outwards by means of the control shaft 14 and the cam disc 16 engaging the plate 12, so that it reaches its normal start position.

After having played the record on the turntable the tone arm is raised and by the control shaft 14 and the cam disc 17 engaging the plate 13 moved out to the side of the turntable and is there lowered on the arm 5, so that the various parts have again reached their starting positions shown in the drawing. In order to ensure exactly the same horizontal distance between the roller 7 and the needle 3, the tone arm must be placed on the same place of the arm 5 every time. After that the same cycle as is described above is repeated.

Figure 3:
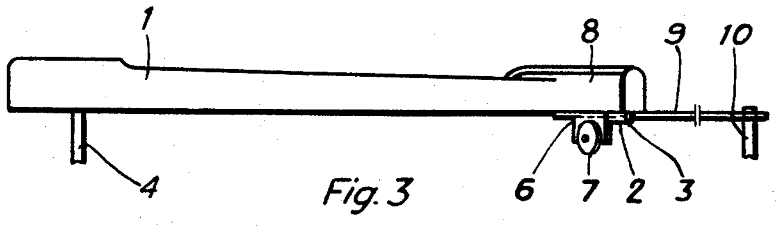
Fig. 3 is a side view of the arrangement according to another embodiment.
Figure 4:
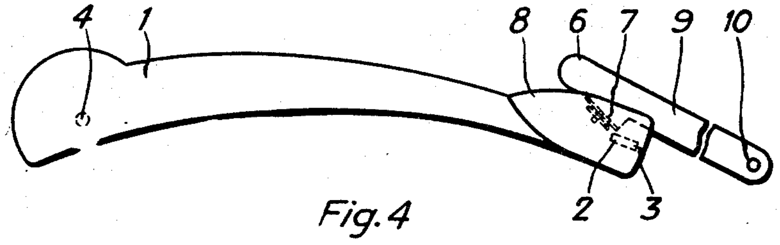
Fig. 4 is a top view of the embodiment according to Fig. 3.

In Figs. 3 and 4 the other embodiment according to the invention is shown. Here an arm 9 corresponds to the arm 5 in the previous embodiment. The tone arm 1 and the arm 9 are in this case provided with shafts with separate centers the tone arm 1 having as before the shaft 4 and the arm 9 having a shaft 10, which is arranged in front of the tone arm head 8. In an analogous way to the previous embodiment the arm 9 carries a projection 6 and a roller 7 and functions as to the rest in exactly the same way.

Of course it is possible to use quite another embodiment than is here described to attain the same result.

What I claim is:

In a phonograph mechanism for playing records of different sizes, the combination comprising a tone arm and a transport member for said tone arm, said tone arm and said transport member each being pivotally mounted around a common vertical axis for independent horizontal movement, said transport member being provided with a support surface for carrying the tone arm, a drive mechanism for raising the tone arm after the playing of a record, moving it out to a rest position and lowering it there onto said support surface, said transport member being operatively connected with said drive mechanism to be moved when carrying said tone arm from said rest position and to be set down onto the record to be played at a distance from its center which at the very most corresponds to the radius of the first convolution of the sound groove of the smallest size intended to be played, means for moving said transport member supported by the record and still carrying said tone arm from said set down position out to the outer edge of the record, said means comprising a roller member on said transport member for engagement with the edge of the record, said roller member being located outside the stylus a distance which corresponds to the outer smooth surface of the record, said transport member also being mounted for vertical movement in relation to the tone arm firstly being moved down outside the edge of the record thereby bringing the stylus of the tone arm into engagement with the first convolution of the sound groove and secondly by a further downward movement to be separated from the tone arm, means being provided to move the transport member from there and out to said rest position while the tone arm is beginning to play the record.

References Cited in the file of this patent

UNITED STATES PATENTS

| | | |
|---|---|---|
| 2,504,596 | Scriven | Apr. 18, 1950 |

FOREIGN PATENTS

| | | |
|---|---|---|
| 462,271 | Great Britain | Mar. 5, 1937 |
| 554,282 | Great Britain | June 28, 1943 |